June 4, 1968     E. BRÜCKNER     3,386,140
METHOD AND MACHINE FOR THE MANUFACTURE OF POTTERY
Filed April 15, 1964     5 Sheets-Sheet 1

June 4, 1968     E. BRÜCKNER     3,386,140

METHOD AND MACHINE FOR THE MANUFACTURE OF POTTERY

Filed April 15, 1964     5 Sheets-Sheet 3

Inventor
Ernst Brückner
by Michael J. Striker
Atty

June 4, 1968  E. BRÜCKNER  3,386,140

METHOD AND MACHINE FOR THE MANUFACTURE OF POTTERY

Filed April 15, 1964  5 Sheets-Sheet 5

Inventor
Ernst Brückner
by Michael J. Striker
Atty

United States Patent Office 3,386,140
Patented June 4, 1968

3,386,140
METHOD AND MACHINE FOR THE
MANUFACTURE OF POTTERY
Ernst Brückner, Adalbert-Stifter-Weg 7,
Selb, Bavaria, Germany
Filed Apr. 15, 1964, Ser. No. 360,016
Claims priority, application Germany, June 19, 1963,
B 72,337
9 Claims. (Cl. 25—24)

The present invention relates to the manufacture of plates, bowls, saucers and similar articles of pottery. More particularly, the invention relates to a method and to a machine for shaping the upper sides and the undersides of such articles.

An important object of the invention is to provide a jigger machine for the manufacture of plates and similar articles of pottery, particularly dinnerware, on a large scale and with utmost accuracy.

Another object of the invention is to construct the jigger machine in such a way that the blanks may be observed prior to and during actual engagement with various supporting, holding and jiggering instrumentalities.

A further object of the invention is to provide a jigger machine of the above outlined characteristics which is constructed and assembled in such a way that its forming tools subject the blanks to balanced stresses, wherein each blank (regardless of its size) may be observed during actual jiggering, wherein the blanks may be finished within exceptionally short periods of time and with utmost accuracy, and wherein such blanks may be jiggered by one or more compact and easy-to-handle forming tools.

An additional object of the invention is to provide a jigger machine wherein the forming tools may be readily exchanged so that the same machine may be used for jiggering the upper side or the underside of a blank which is to form a plate, bowl, saucer or a similar article of dinnerware.

A concomitant object of the invention is to provide an improved forming tool, also known as jigger tool or profile, which may be used in a jigger machine of the above outlined characteristics and which may jigger a blank without actually cutting into the material of the blank.

Still another object of the invention is to provide a forming tool which is especially suited for jiggering of dinnerware and which, even though smaller than a blank, is capable of completely finishing one side of a blank in a single operation.

A further object of the invention is to provide a forming tool whose dimensions are much smaller than the maximum dimension of a blank which is being jiggered thereby.

An additional object of the invention is to provide a readily exchangeable, lightweight and exceptionally compact forming tool which may be rotated, shifted, rocked and/or otherwise moved with or relative to the blanks by resorting to comparatively small electric, pneumatic or hydraulic motors.

Another object of the invention is to provide a novel method of jiggering plates, bowls, saucers and analogous articles of dinnerware consisting of porcelain, earthenware and similar plastic materials.

With the above objects in view, one feature of my invention resides in the provision of a method of jiggering blanks for plates and similar articles of pottery, particularly dinnerware, in a jigger machine wherein the profile of the blank-supporting mold is complementary to the profile of one side of the article to be obtained upon jiggering of the blank and wherein the other side of the blank is jiggered by one or more revolving forming tools of conical shape which do not cut into the material of the blank but merely roll therealong. The method comprises the steps of placing a blank onto the mold so that one side overlies the mold and that the other side remains exposed, bringing the blank in contact with at least one forming tool whose axis is inclined with reference to the axis of the mold and which contacts the blank along a line extending radially thereof, and rotating the mold and the forming tool or tools whereby the tool or tools roll along and thereby jigger the exposed side of the blank by simultaneously pressing the one side of the blank against the mold so that the one side of the blank follows closely the profile of the mold. In other words, both sides of the blank may be finished in a single operation which means that the blank need not be taken off a first mold and placed onto a second mold.

The method of my invention may be carried out in connection with preformed blanks or, alternatively, the forming tool or tools may jigger a batch of clay or similar plastic material which is placed onto the mold. In such instances, it is advisable to subject the batch to at least two consecutive jiggering operations in the first of which a first forming tool or a first group of forming tools preforms the batch to obtain a blank whose outline resembles the outline of a plate or the like, and in the second of which a second forming tool or a second group of forming tools thereupon completes the shaping while the preformed blank remains on the same mold. The forming tool or tools may be provided with drive means to drive the mold through the intermediary of the blank, or each forming tool may rotate in response to frictional engagement with a blank which is supported by a driven mold.

The just described method may be resorted to for jiggering the outer side or the underside of a blank, i.e., if the profile of the mold is complementary to the profile of the underside of a plate, the forming tool or tools will jigger the outer side of the blank.

In accordance with another feature of my invention, the blank may be jiggered by two or more forming tools which engage the blank simultaneously and which are mounted in such a way that the blank is subjected to balanced stresses. Thus, if the blank is engaged by two forming tools, the tools are mirror symmetrical with reference to each other.

The novel features which are considered as characteristic of the invention are set forth in particular in the appended claims. The improved jigger machine itself, however, both as to its construction and the mode of operating the same, together with additional features and advantages thereof, will be best understood upon perusal of the following detailed description of certain specific embodiments with reference to the accompanying drawings, in which:

Figure 1:
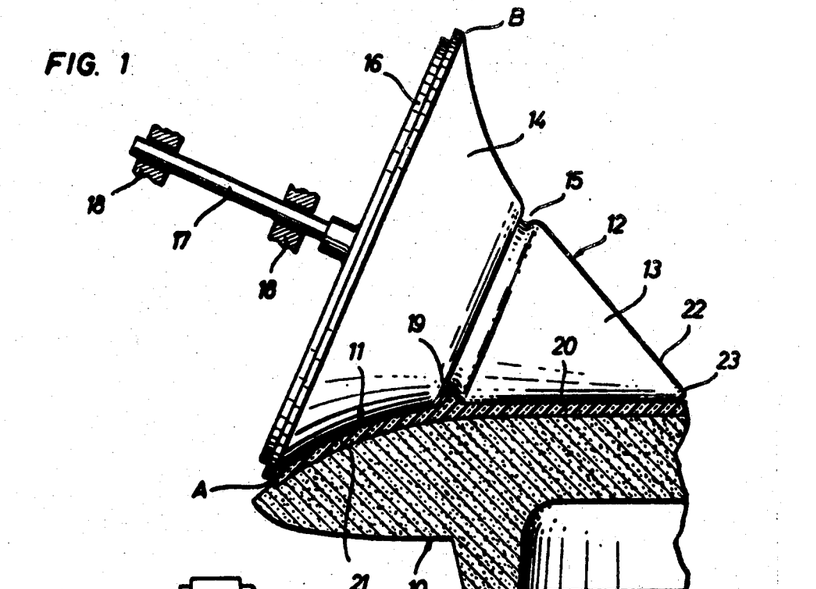
FIG. 1 is a side elevational view of a forming tool which is constructed in accordance with one embodiment of my invention.

Referring to FIG. 1, there is shown a portion of a jigger machine comprising a rotary mold 10 which supports one side of a substantially disk shaped blank 11 made of clay and ready to be shaped into a plate, bowl, saucer or a similar article of dinnerware. The other side of the blank 11 is engaged by a rotary forming tool 12 which is constructed in accordance with one embodiment of my invention. This forming tool comprises a conical front end portion 13 and a frustoconical rear end portion or base 14 which diverges in a direction away from the front end portion 13 and is separated therefrom by an annular groove 15 of substantially semicircular cross section. This groove is located in a plane which is perpendicular to the axis of the forming tool. The base 14 is detachably secured to a disk 16 whose shaft 17 is rotatable in suitable antifriction bearings 18, and it will be noted that the maximum diameter of the base is substantially less than the diameter of the blank, i.e., only slightly more than the radius of the blank.

In the position of FIG. 1, the forming tool 12 has completed the jiggering of the blank 11 so that the latter resembles a plate having at its underside an annular rib or leg 19 formed by a mass of material which fills a portion of the groove 15. The surface of the conical front end portion 13 has completed the jiggering of the exposed side (underside) of the disk shaped central section 20 of the blank 11, and the concave surface of the frustoconical base 14 has completed the jiggering of the exposed side of the annular rim 21 which extends outwardly and beyond the annular leg 19. This leg has been jiggered by the surface bounding the groove 15.

The other side of the blank 11 is shaped by the top portion of the mold 10 so that the blank is now ready to be transferred to the next processing station, not shown. The forming tool 12 may be driven independently of the mold 10 or, alternatively, this tool may rotate in response to frictional engagement with the blank 11 whereby it rolls along the exposed side of the blank. The blank 11 is preformed in conventional manner and is thereupon placed onto the mold 10.

The tip 22 of the front end portion 13 is rounded and is provided with a punch mark 23 so that the tool 12 may be readily mounted between the headstock and the tailstock of a lathe during precision finishing of its surfaces. The tip 22 is aligned with the axis of the blank 11 (i.e., with the axis of the central section 20) when the blank is engaged by the tool 12.

When in actual use, the end portions of each forming tool engage the exposed side of the blank 11 along a line which extends radially of the blank. The blank is readily observable during actual engagement with the forming tools because the section of each tool in a plane passing through its axis resembles an isosceles triangle wherein the angle between the sides of equal length is substantially less than 180 degrees. For example, the angle between the lines connecting the tip 22 with the points A, B on the projection of the base 14 into the plane of FIG. 1 is less than 90 degrees.

Figure 2:
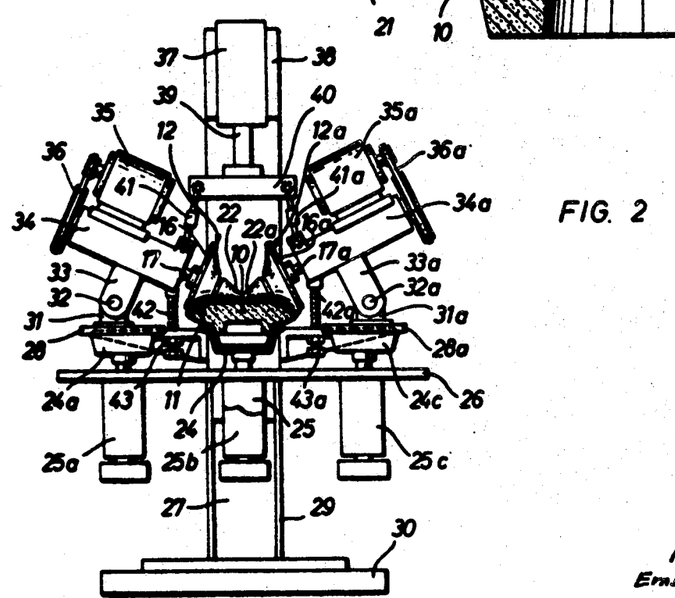
FIG. 2 is a front elevational view of a jigger machine which comprises two forming tools of the type shown in FIG. 1, one of the spindles and a portion of the blank-supporting mold being broken away.
Figure 3:
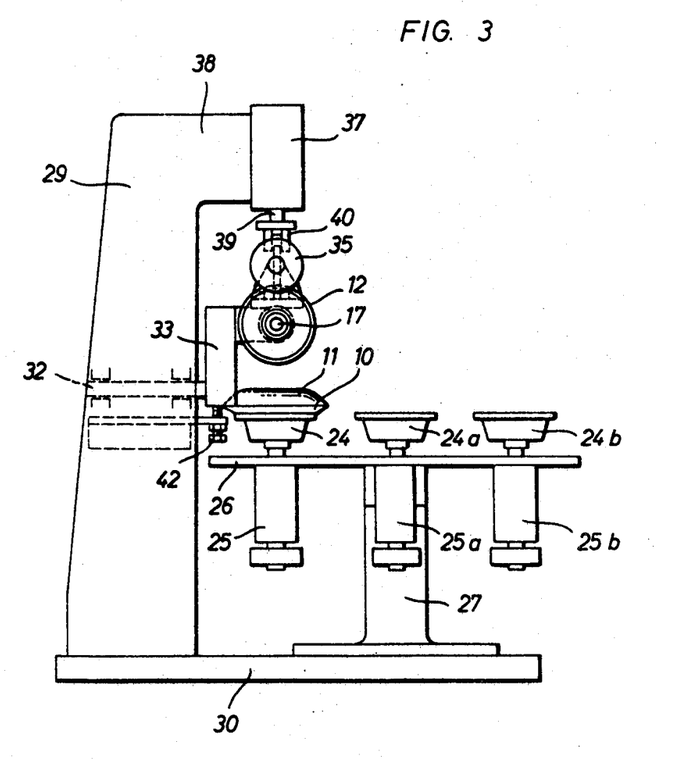
FIG. 3 is a side elevational view of the jigger machine.

FIGS. 2 and 3 illustrate a complete jigger machine which embodies the structure of FIG. 1. FIG. 2 shows that the machine is equipped with two forming tools 12, 12a whose tips 22, 22a are adjacent to each other at a point located on the axis of the mold 10. This mold is detachably secured to a rotary chuck 24 provided at the upper end of a spindle 25. The spindle 25 is eccentrically supported by a rotary conveyor here shown as a turntable 26 which is mounted on a post 27, and this turntable 26 supports three additional spindles 25a, 25b, 25c which are respectively provided with chucks 24a, 24b, 24c so that at least one mold may be secured to one of the chucks 24a–24c while the forming tools 12, 12a jigger the blank 11 on the mold 10. The turntable 26 may be rotated automatically or by hand, depending on the desired output of the machine and on the extent to which the operation is automated.

The forming tools 12, 12a are supported by two inverted L-shaped carriers 28, 28a mounted on an upright frame member 29 which is secured to a base plate 30. This base plate also supports the post 27, and each carrier is provided with an upwardly extending bearing plate 31, 31a for two horizontal pivots 32, 32a. These pivots extend through brackets 33, 33a which are respectively secured to and extend downwardly from two bearing sleeves 34, 34a. The sleeve 34 supports the shaft 17 which is rotated by an electric motor 35 through a belt and pulley transmission 36. This transmission may be replaced by a train of meshing gears, by sprockets and chains or the like.

The means for rocking the sleeve 34 about the axis of the pivot 32 comprises a double-acting hydraulic cylinder 37 which is mounted on the forwardly extending head 38 of the frame member 29 and whose downwardly extending piston rod 39 is connected with a crosshead 40. This crosshead is articulately connected with the sleeve 34 by an adjustable linkage 41. An adjustable stop 42, mounted on the carrier 28, extends into the path of the sleeve 34 and determines the extent to which the forming tool 12 may approach the mold 10, i.e., this stop determines the ultimate thickness of the blank 11. In the illustrated embodiment, the stop 42 comprises a threaded bolt which extends through a tapped bore provided in the carrier 28 and which is normally held in a selected position of axial adjustment by a lock nut 43. The corresponding parts of the structure which rotates, supports and rocks the second forming tool 12a are identified by similar reference numerals, each followed by the letter a. It will be noted that the forming tools 12, 12a are mirror symmetrical with reference to each other and that they may but need not be rocked simultaneously in response to axial displacements of the piston rod 39. The bearings 18, shown in FIG. 1, are accommodated in the interior of the sleeve 34, and similar bearings are provided in the sleeve 34a for the shaft 17a of the forming tool 12a.

FIG. 2 shows the forming tools 12, 12a in positions they assume during actual jiggering of the blank 11. The piston rod 39 descends at a rate controlled by the delivery of pressure fluid to the upper chamber of the cylinder 37 so that the thickness of the blank 11 decreases gradually. The stops 42, 42a arrest the respective sleeves 34, 34a when the thickness of the blank has been reduced to a desired value and, if the machine is operated in a fully automatic way, one of these stops or another part which rocks about the pivot 32 or 32a may actuate a valve in the hydraulic circuit of the cylinder 37 to reverse the piston rod 39 and to move the forming tools 12, 12a upwardly and away from the finished blank. As a rule, the construction of the linkages 41, 41a is preferably such that one of the forming tools 12, 12a begins to rise while the other forming tool continues to roll along the blank 11 for a period of time determined by adjustment of the respective linkage. When the forming tools are fully withdrawn and assume their upper end positions, shown in FIG. 3, the turntable 26 may be rotated through 90 degrees to move another blank into requisite position in which the blank is ready to be treated by the forming tools 12, 12a as soon as the piston rod 39 begins to descend. It is possible to construct the hydraulic circuitry of the cylinder 37 in such a way that the piston rod 39 begins to descend in response to rotation of the turntable 26 through 90 degrees or through another angle, depending on the number and distribution of chucks and spindles which are carried by the turntable. It goes without saying that the cylinder 37 may be operated pneumatically or that this cylinder may be replaced by a mechanical or electrical arrangement which is capable of rocking the forming tools 12, 12a about the pivots 32, 32a.

When the finished blank 11 is rotated by the turntable 26 to move out of the range of the forming tools 12, 12a, the operator uses or operates a suitable ejector mechanism, not shown, which separates the mold 10 from the chuck 24 to allow for transfer of the finished blank to the next treating or processing station.

The forming tools are readily separable from the respective disks 16, 16a to be replaced by differently configurated or dimensioned forming tools so that the machine of FIGS. 2 and 3 may be utilized for jiggering different articles of dinnerware. It is equally possible to equip the machine with a single forming tool or with three or more forming tools even though it normally suffices to provide two forming tools which are arranged in a manner as shown in FIGS. 2 and 3.

A very important advantage of the just described jigger machine is that the forming tools 12, 12a conceal only a small portion of the blank so that the jiggering operation may be inspected at all times. Also, by utilizing forming tools whose tips extend only to the center of the mold 10, two or more forming tools may be used simultaneously without any danger that they would interfere with each other. Furthermore, such forming tools may be manufactured with substantial savings in time and material, not only because they resemble cones but also because the axial length of their precision-finished surfaces equals or approaches the radius of the blank. In other words, the dimensions of the forming tools can be much smaller than the maximum dimension of the blank so that the weight of each tool is comparatively small with resultant savings in energy which is consumed for rotating the tools and with savings in material of the structure which serves to support, to guide and to rock the forming tools when the machine is in actual use.

The provision of two or more forming tools is of advantage because the blank is pressed against the mold at several points. The distribution of loads upon the blank is particularly advantageous when the forming tools are mounted symmetrically. Of course, it should be mentioned here that the forming tools need not necessarily be rocked because satisfactory results can be obtained if the forming tools are mounted in vertical slides so that they may reciprocate in straight paths in directions toward and away from the exposed side of the blank. Such movements may be controlled by cams, by pneumatic or hydraulic cylinders or in another suitable way.

The jiggering of the leg 19 at the underside of a plate, saucer or a similar article of dinnerware always presented a serious problem in conventional jigger machines, especially in such machines wherein the dimensions of the forming tool exceed the dimensions of the blanks. This problem has been solved by the advent of my invention because the groove 15 will allow the leg 19 to be formed in a fully automatic way and with utmost precision at the time the end portions 13, 14 jigger the remainder of the blank. The improved jigger machine is especially suited for use in small family-owned manufacturing plants whose owners normally cannot afford to purchase expensive and complicated copying attachments such as are being used in large manufacturing plants to insure accurate finishing of dinnerware.

Another serious problem in conventional jigger machines is that much time is spent for proper adjustment of the forming tool with reference to the mold. Thus, and especially if the forming tool overlies the major part of the blank, it is necessary to repeatedly lift the tool and to produce impressions in the exposed side of the blank in order to make sure that the tool is properly mounted and will treat the blank in a desired manner. By providing the machine with one or more forming tools which conceal a small portion of the blank, I insure that adjustments in the position of each tool may be completed without repeated lifting and lowering. Such rapid adjustment produces savings in time and less wear on the moving parts.

Figure 4:
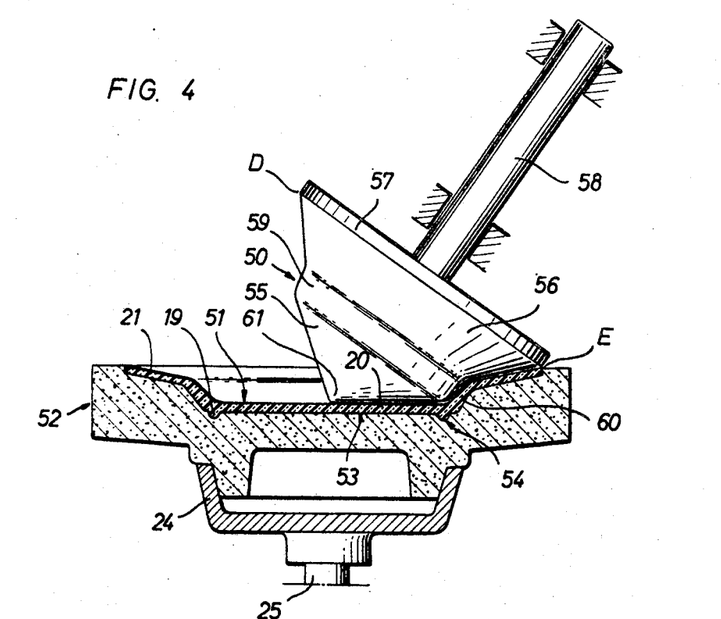
FIG. 4 is a side elevational view of a modified forming tool.

Referring to FIG. 4, there is shown a modified forming tool 50 which is utilized for jiggering the other (outer) side of a plate, saucer, bowl or a similar article of dinnerware. The blank 51 which has been preformed in conventional manner to resemble a disk is placed into the centrally located recess 53 provided at the upper side of a rotary mold 52 which is received in the chuck 24 of a spindle 25 mounted in a turntable 26, see FIG. 5. The upper side of the mold 52 is provided with a concentric groove 54 serving to receive such material of the blank 51 which is to form the leg 19.

The forming tool 50 comprises a conical front end portion 55, a frustoconical rear end portion or base 56 which is detachably secured to a disk 57 provided at the lower end of a shaft 58, and a median portion 59 whose peripheral surface is inclined with reference to the peripheral surfaces of the end portions 55, 56. The median portion 59 may be of cylindrical or frustoconical shape, depending on the inclination of the shaft 58 and on the desired inclination of the annular median wall 60 of the blank 51. It will be noted that the rear end portion 56 diverges in a direction away from the front end portion 55 and that the maximum diameter of the rear end portion 56 is greater than the maximum diameter of the median portion 59. If the median portion 59 is of frustoconical shape, it diverges in a direction away from the front end portion.

The front end portion 55 rolls along and thereby jiggers the upper side of the central section 20 of the blank 51, the base 56 rolls along and jiggers the upper side of the annular rim 21, and the median portion 59 rolls along and jiggers the outer side of the median wall 60.

Figure 5:
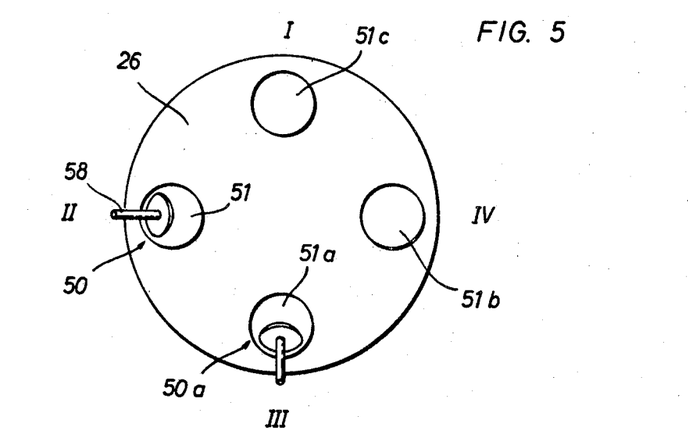
FIG. 5 is a top plan view of a portion of a jigger machine which comprises two forming tools of the type shown in FIG. 4.

As shown in FIG. 5, the jigger machine which includes the turntable 26 preferably comprises two forming tools 50, 50a which are mounted in such a way that the projections of their axes into the plane of the turntable make an angle of 90 degrees. At the station 1, a preformed blank 51c is placed onto the corresponding empty mold by a feed mechanism of known design and while the turntable is at a standstill so that the blank is ready to be treated by the tool 50 after the turntable 26 is rotated through 90 degrees. At the station 11, the blank 51 is being treated by the forming tool 50, and the blank 51a at the station III is being treated by the second forming tool 50a. A completely jiggered blank 51b is located at the station IV and is ready to be removed from the machine. The operator then places an empty mold onto the chuck of that spindle which is located at the station IV so that this empty mold is ready to receive a blank as soon as it reaches the station I. The machine of FIGS. 4 and 5 is very similar to the machine of FIGS. 2 and 3, with the sole exception that the forming tools 50, 50a are spaced from each other and that they may (but need not) be moved independently of each other. For example, it might be necessary to treat a blank with the forming tool 50 for a period of time which is longer or shorter than the period of time necessary to thereupon complete the jiggering operation with the forming tool 50a.

A very important advantage of the just described jigger machine is that the exposed side of the blank may be jiggered without any turning and without requiring removal from one machine and transfer into another machine, i.e., with little loss in time. Thus, and since the forming tools 50, 50a jigger that side of the blank which is the outer or upper side of a finished plate, this side must normally be finished with greater precision than the other side, namely, that side which is jiggered by the forming tools 12, 12a of the machine shown in FIGS. 2 and 3. The surface bounding the recess 53 of the mold 52 is finished with sufficient precision to insure that the underside of the blank 51 will receive a required form and is treated sufficiently to obviate any further treatment. Thus, by using a mold 52 of the type shown in FIG. 4 and by using one or more forming tools of the type shown in FIGS. 4 and 5, I provide a jigger machine wherein both sides of a blank which is to form a plate or the like may be finished in a simultaneous operation so that the blank need not be removed, inverted or otherwise shifted during such treatment excepting, of course, that it must rotate with respect to and with the turntable 26. In fact, the machine of FIGS. 4 and 5 may be used for jiggering of non-preformed blanks so that the recess 53 merely receives a batch of clay which is thereupon shaped and finished in a fully automatic way by contact with the forming tool 50a and/or 50.

Another important advantage of the just described machine is that the number of molds is reduced to a minimum. This is due to the fact that the mold 52 comes in contact with the underside but not with the upper side of the blank 51. Thus, and since the underside of the blank (namely, that side which is provided with the annular leg or rib 19) is not seen by the user, it need not be finished to the same degree of precision finish as the other side which is observed during eating and which is the one shown when the plate is on display. Therefore, even if the surface surrounding the recess 53 is scratched or otherwise damaged after prolonged use, this does not affect the appearance of the finished blank because only the underside of the blank comes in contact with the mold. Particularly when the jigger machine of FIGS. 4 and 5 is used for jiggering of popularly priced dinnerware, the mold 52 may be used for very long periods of time.

The forming tools 50, 50a may be moved toward and away from the respective molds in such a way that their axes remain parallel to themselves or in a manner as illustrated in FIGS. 2 and 3, i.e., they may be rocked about fixed horizontal pivot axes which are adjacent to the stations II and III. In the operative position of FIG. 4, the axis of the forming tool 50 is inclined with reference to the axis of the mold 52, and the angle enclosed by these axes may approximate 45 degrees. This is of advantage because the forming tool 50 overlies a small portion of the blank so that the tip 61 of its front end portion 55 may be adjusted in such a way that it is located on an extension of the axis of the spindle 25. Any excess material of the blank is squeezed out of the recess 53 and may be removed after the forming tool 50 has been lifted away from the mold 52.

If desired, the number of stations may be increased to five or more. This is desirable when the empty molds at the station I receive batches of clay, i.e., when the machine is used for jiggering of non-preformed batches of plastic material. Such machines are preferably equipped with devices which press the batches into the recesses 53 of the respective molds to fill out the grooves 54 before the batches come in contact with the first forming tool.

The angle between the lines connecting the tip 61 with the points D, E on the projection of the base 56 into the plane of FIG. 4 is about 90 degrees so that the major part of the blank 51 is readily observable when its exposed side is engaged by the forming tool 50.

Figure 6:
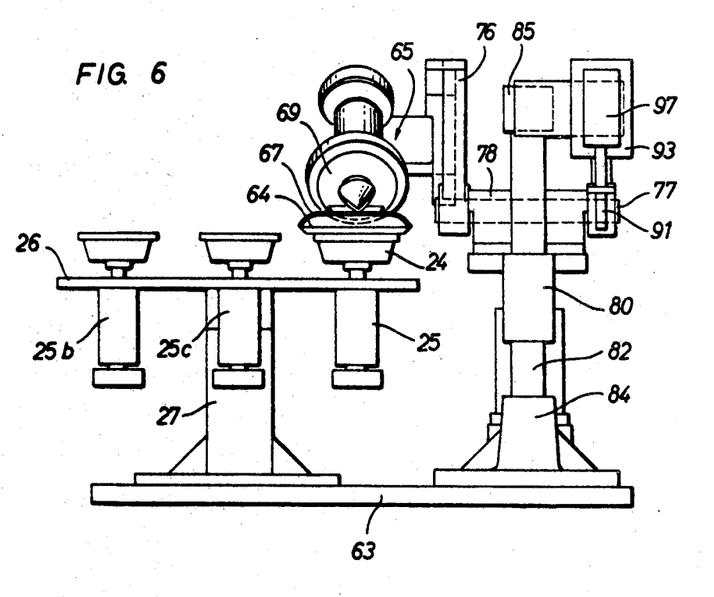
FIG. 6 is a side elevational view of a third jigger machine whose forming tool is similar to the forming tool of FIG. 1.
Figure 7:
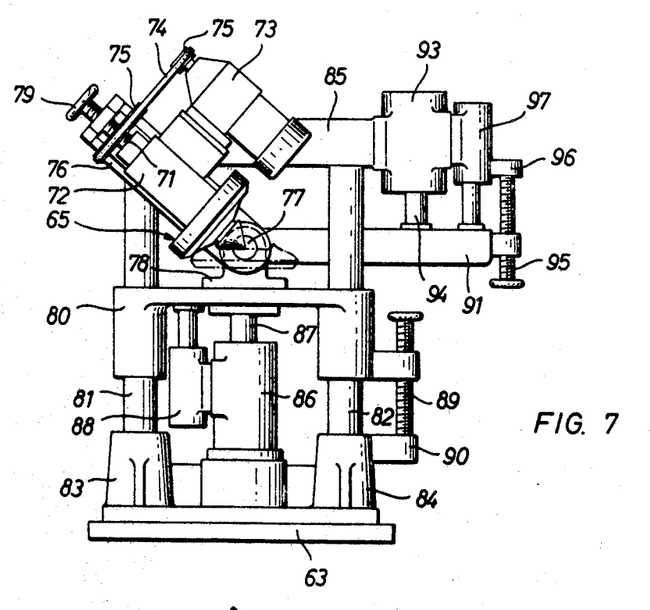
FIG. 7 is a front elevational view of the jigger machine shown in FIG. 6, with the conveyor for blanks omitted for the sake of clarity.

Referring to FIGS. 6 and 7, there is shown a third jigger machine which comprises a single forming tool 65 but which may also be equipped with two or even more forming tools. This forming tool 65 is used for the same purpose as the forming tool 12 of FIG. 1, and it again comprises two conical end portions including a conical front end portion 66 serving to jigger the central section 20 of a substantially disk shaped blank 67, and a frusto-conical rear end portion or base 68 which serves to jigger the annular rim 21 of the blank. The two end portions are separated by an annular groove 69 which receives the material of the leg 19 when the forming tool 65 rolls along the exposed side of the blank.

The blanks are delivered consecutively by a turntable 26 which is identical with the turntable of FIGS. 2 and 3. It comprises four rotary spindles (only the spindles 25, 25b, 25c are shown in FIG. 6) whose chucks may receive molds 64. In FIG. 6, the chuck 24 of the spindle 25 supports a mold 64 which holds the blank 67 while the latter is being jiggered by the forming tool 65.

An important feature of the jigger machine shown in FIGS. 6 and 7 is that it is capable of moving the forming tool 65 with reference to the blank 67 in such a way that the tip 70 of the front end portion 66 remains on an extension of the axis of the mold 64 even though the forming tool is movable toward and away from and is rockable with reference to the blank. In other words, and contrary to the operation of the machine shown in FIGS. 2 and 3 wherein the tip 22 of the front end portion 13 pivots toward and away from the axis of the mold 10, the tip 70 of the front end portion 66 will move along a straight line which coincides with the axis of the spindle 25, chuck 24 and mold 64. It was found that such mounting enables the forming tool to jigger a blank with utmost precision regardless of whether the forming tool is mounted for translatory movement (in parallelism with itself) and/or for rocking movement about a horizontal axis. In the embodiment of FIGS. 6 and 7, the forming tool 65 is mounted in such a way that it may be rocked at the time its end portions move forward or away from the exposed side of the blank 67.

The shaft 71 of the forming tool 65 is rotatable in a bearing sleeve 72 which carries an electric motor 73. The output shaft of this motor drives a belt transmission 74 which rotates the shaft 71 and which includes adjustable pulleys 75 so that the motor 73 may drive the forming tool 65 at different speeds. The sleeve 72 is mounted on a guide rail 76 which is fixed to and which is rockable with a horizontal pivot 77, and this pivot is mounted on a carrier 78. The axis of the pivot 77 intersects an extension of the axis of the mold 64, and the sleeve 72 is connected with a handwheel 79 which serves as a means for adjusting the position of the forming tool 65 with reference to the guide rail 76 in such a way that the tip 70 is located on an extension of the axis of the pivot 77 and on an extension of the axis of the mold 64. The carrier 78 is mounted on a vertically reciprocable table 80 which is guided by two vertical columns 81, 82 mounted in tubular holders, 83, 84 of the base plate 63. The columns 81, 82 extend upwardly and beyond the table 80 and their upper end portions are connected to a horizontal traverse 85. Of course, the guide means including the parts 80–85 may be replaced by a vertical guideway wherein the carrier 78 is adapted to slide.

The means for reciprocating the table 80 along the columns 81, 82 comprises a pneumatic cylinder 86 which is mounted on the base plate 63 and whose upwardly extending piston rod 87 is connected to the table. This cylinder also lifts the forming tool 65 so that the turntable 26 is then free to rotate in order to advance the spindle 25c to the forming station. The cylinder 86 may be double acting and is then adapted to automatically return the table 80 to its lower end position, shown in FIG. 6, in which the forming tool 65 may be moved into linear engagement with the next blank. For example, the turntable 26 may actuate a magnet valve which reverses the direction in which a compressed fluid flows into the cylinder so that the table 80 is lifted automatically as soon as the new blank is ready to be jiggered by the forming tool. It is also possible to construct the cylinder 86 as a single-acting cylinder so that the table 80 descends by gravity as soon as the valve which is tripped by the turntable 26 permits escape of compressed fluid from the cylinder. This modification is actually shown in FIGS. 6 and 7, i.e., the cylinder 86 is a single acting cylinder and the table 80 descends by gravity. When the table 80 is moved to its upper end position and a new blank is delivered to the jiggering station, the forming tool 65 assumes the position of FIG. 8 in which its end portions 66, 68 are spaced from the exposed side of the blank. The descent of the table 80 is controlled by an adjustable hydraulic brake 88 which insures that the forming tool 65 descends at a predetermined rate of speed such as is best suited to insure satisfactory jiggering of the blank. When the forming tool 65 reaches its lower end position, the table 80 is arrested by an adjustable stop 89 including an axially adjustable spindle whose lower end strikes against a lug 90 on the holder 84. The stop 89 enables the operator to convert the jigger machine for shaping of different blanks, i.e., to vary the thickness of the blanks by determining the length of stroke of the table 80.

Figure 8:
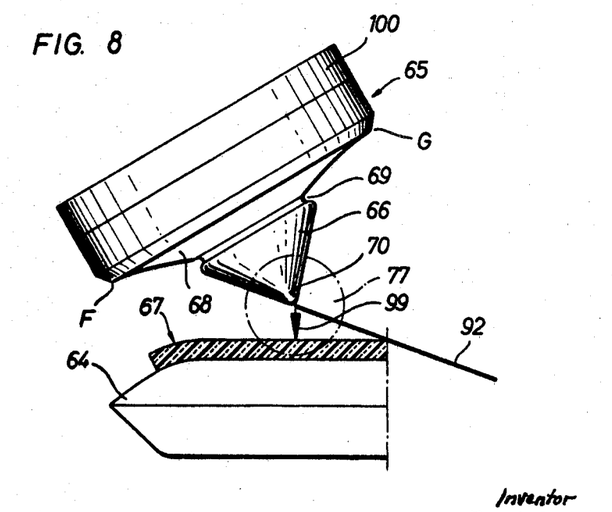
FIG. 8 is an enlarged side elevational view of the forming tool which is used in the jigger machine of FIGS. 6 and 7, the tool being illustrated in raised position.
Figure 9:
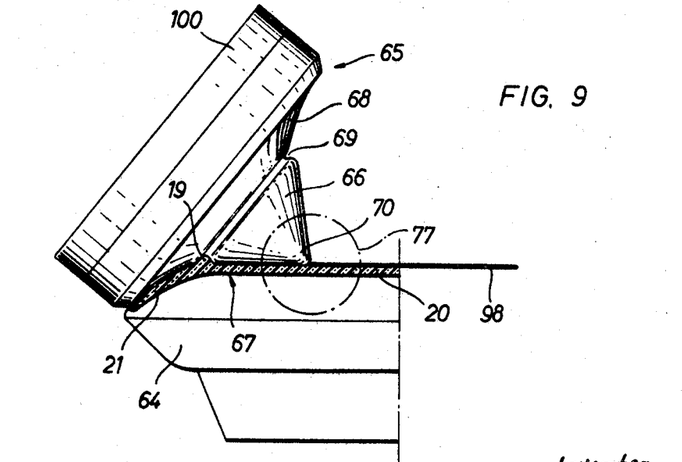
FIG. 9 illustrates the tool of FIG. 8 in operative position.

In order that the forming tool 65 may be rocked from the position of FIG. 8 to that of FIG. 9, the jigger machine of FIGS. 6 and 7 comprises rocking means including a motion transmitting arm 91 which is secured to the pivot 77 and which normally extends in a direction indicated in FIG. 8 by a heavy line 92. This arm 91 serves to rock the pivot 77 together with the rail 76 and forming tool 65 about a horizontal axis which coincides with the axis of the pivot 77 and which intersects the vertical axis of that mold 64 which is located at the shaping station. The traverse 85 carries a pneumatic rocking cylinder 93 whose piston rod 94 tends to pivot the arm 91 in a clockwise direction, as viewed in FIG. 7, so as to hold the forming tool 65 in the position of FIG. 8. When the magnet valve which controls escape of compressed fluid from the rocking cylinder 93 is opened (either automatically or by hand), the forming tool 65 begins to pivot by gravity in a counterclockwise direction, as viewed in FIG. 7, and moves to the position of FIG. 9 in which the end portions 66, 68 may engage the exposed side of the blank 67. Thus, the combined weight of the guide rail 76, sleeve 72 and forming tool 65 exceeds the weight of the arm 91 so that the forming tool begins to travel about the axis of the pivot 77 as soon as the fluid is permitted to escape from the cylinder 93. The arm 91 carries an adjustable stop 95 which comes in abutment with a projection 96 provided on the casing of a hydraulic brake 97 which controls the speed at which the forming tool 65 may pivot from the position of FIG. 8 to that of FIG. 9. The position of the arm 91 when the stop 95 engages the projection 96 is shown in FIG. 9 by a heavy line 98. The arm 91 then remains in the position 98 while the table 80 descends (arrow 99 in FIG. 8) to move the forming tool 65 into or out of actual engagement with the blank 67. The forming tool is lifted away from the finished blank when the machine admits fluid into the cylinders 86, 93 in such a way that the piston rod 87 moves upwardly to lift the table 80, and that the piston rod 94 moves downwardly to rock the arm 91 in a clockwise direction, as viewed in FIG. 6.

The brake 97 may be replaced by a mechanical or pneumatic brake and the cylinders 86, 93 may be operated by oil or another liquid pressure medium.

It will be noted that, once the forming tool 65 is adjusted by the handwheel 79 in such a way that its tip 70 is located on an extension of the axis of the pivot 77 (which intersects the axis of the mold 64), movements of the table 80 along the columns 81, 82 or movements of the arm 91 about the axis of the pivot 77 cannot displace the tip 70 from a line which coincides with the axis of the blank 67. Thus, and even if the mold 64 is replaced by another mold, the forming tool remains in optimum position with reference to the blanks and the operator need not touch the handwheel 79. This handwheel is manipulated at the time the forming tool 65 is replaced by another forming tool which can be achieved by detaching the tool 65 from the disk 100, shown in FIGS. 8 and 9.

The position of the forming tool 65 with reference to the guide rail 76 need not be changed when the operator desires to change the ultimate thickness of the blank 67 because such adjustments may be effected by means of the stop 89.

The machine of FIGS. 6 and 7 is operated as follows:

In the first step, the operator manipulates the handwheel 79 in order to move the tip 70 into registry with an extension of the axis of the mold 64. The reciprocating cylinder 86 is connected with a source of compressed fluid so that the table 80 is maintained in its upper end position in which the forming tool is spaced from the turntable 26 and the latter may be rotated through 90 degrees in order to advance a fresh blank 67 to the jiggering station. The rocking cylinder 93 is also connected with the source of compressed fluid so that the forming tool is maintained in the inclined position of FIG. 9 in which the arm 91 is pivoted in a clockwise direction and is in the inclined position of FIG. 9 in which the arm 91 is pivoted in a clockwise direction and is in the position 92.

In the next step, the machine opens the valve which controls the escape of pressure fluid from the reciprocating cylinder 86 whereby the table 80 descends at a speed determined by the brake 88, and the tip 70 penetrates into the material of the blank to the extent determined by the stop 89. The machine also opens the valve which controls the escape of pressure fluid from the rocking cylinder 93 so that the arm 91 begins to pivot toward the position 98 of FIG. 9 at a speed determined by the brake 97 and through an angle determined by the stop 95 whereby the end portions 66, 68 move into linear engagement with the blank 67 and roll therealong to shape it into a plate which is ready to be removed from the machine as soon as the stop 95 strikes the projection 96. The mold 64 may be rotated in response to engagement between the revolving forming tool 65 and the blank 67.

Upon completion of the jiggering operation, the cylinders 86, 93 receive compressed fluid so as to lift the table 80 away from the mold 64 and to pivot the forming tool 65 back to the position of FIG. 8 whereby the turntable 26 has room to advance a fresh blank of the jiggering station.

The two movements of the forming tool (angular movement about the axis of the pivot 77 and translatory movement toward or away from the mold 64) may be performed simultaneously, for example, in such a way that the stop 95 strikes against the projection 96 at the time the tip 70 comes in contact with the material of the blank 67. As a rule, the forming tool 65 remains in its lower end position (FIG. 9) for a period of time which is sufficient to insure that the leg 19 is free of voids and that the profile of the underside of the blank 67 follows with great accuracy the profile of the mold 64.

A very important advantage of the machine which is shown in FIGS. 6 and 7 is that the table 80 must perform very short strokes so that the intervals between consecutive jiggering operations may be reduced to a minimum. Also, the spindles of the turntable 26 require no adjustment whatever so that the construction of the turntable may be simplified considerably. This turntable may be replaced by another conveyor which is capable of delivering blanks at desired intervals, either in response to automatic impulses or by manual control.

The angle between the lines connecting the tip 70 with the points F, G on the projection of the base 68 into the plane of FIG. 8 is substantially less than 180 degrees and only slightly greater than 90 degrees so that the forming tool 65 overlies and conceals a small portion of the blank 67.

It will be understood, of course, that the term "forming tool" refers to, and includes in its definition as herein employed, the expression—profile—which in this art is used to describe the instrumentality which serves for carrying out the jiggering operation.

Without further analysis, the foregoing will so fully reveal the gist of the present invention that others can, by applying current knowledge, readily adapt it for various applications without omitting features that constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A machine for jiggering substantially disk shaped blanks for plates and similar articles of pottery, comprising a rotary mold having a profile complementary to the profile of one side of the jiggered blank; a rotary forming tool comprising a conical front end portion and a frustoconical rear end portion, said conical front end portion having a tip arranged to be aligned with the axis of a blank which is to be jiggered by said tool, the section of said front end portion in a plane passing through the axis thereof resembling an isosceles triangle wherein the angle between the sides of equal length is less than 90°, said rear end portion diverging in the same direction as but at a greater angle than said front end portion, said tool being arranged to engage the other side of a blank on said mold in such a way that the blank is contacted along a line extending radially thereof, said tool having a tip located on an extension of the axis of said mold; means for rotating said tool and said mold so that the tool rolls along and jiggers the other side of a blank on said mold; means for rocking said tool about an axis which is perpendicular to the axis of said mold and which passes through the tip of said tool; and means for varying the distance between said tool and said mold in the axial direction of said mold.

2. A machine for jiggering substantially disk shaped blanks for plates and similar articles of pottery, comprising a rotary mold having a profile complementary to the profile of one side of the jiggered blank; a rotary forming tool of conical shape arranged to engage the other side of a blank on said mold in such a way that the blank is contacted along a line extending radially thereof, said tool having a tip; means for adjusting said tool in the axial direction thereof so that said tip is located on an extension of the axis of said mold; means for rotating said tool and said mold so that the tool rolls along and jiggers the other side of a blank on said mold; means for rocking said tool about an axis which is perpendicular to the axis of said mold and which passes through the tip of said tool; and means for varying the distance between said tool and said mold in the axial direction of said mold.

3. A machine for jiggering substantially disk shaped plates and similar articles of pottery, comprising a mold arranged to rotate about a vertical axis and having an upper side with a profile complementary to the profile of one side of the jiggered blank; a rotary forming tool comprising a conical front end portion and a frustoconical rear end portion, said conical front end portion having a tip arranged to be aligned with the axis of a blank which is to be jiggered by said tool, the section of said front end portion in a plane passing through the axis thereof resembling an isosceles triangle wherein the angle between the sides of equal length is less than 90°, said rear end portion diverging in the same direction as but at a greater angle than said front end portion, said tool being located at a level above said mold and arranged to engage the other side of a blank on said mold in such a way that the blank is contacted along a line extending radially thereof, said tool having a tip located on an extension of the axis of said mold; means for rotating said tool and said mold so that the tool rolls along and jiggers the other side of a blank on said mold; means for rocking said tool about an axis which is perpendicular to the axis of said mold and which passes through the tip of said tool whereby the axis of said tool is inclined with reference to the axis of said mold when the tool is in linear contact with the blank; and reciprocating means for moving said tool vertically toward and away from said mold, said reciprocating means comprising a fluid-operated cylinder arranged to move said tool upwardly and away from said mold and to permit said tool to descend by gravity toward said mold and into engagement with the blank.

4. A machine as set forth in claim 3, further comprising brake means for regulating the speed of said tool during movement toward and into engagement with the blank.

5. A machine for jiggering substantially disk shaped blanks for plates and similar articles of pottery, comprising a rotary mold having a profile complementary to the profile of one side of the jiggered blank; a rotary forming tool comprising a conical front end portion and a frustoconical rear end portion, said rear end portion diverging in the same direction as but at a greater angle than said front end portion, said tool being arranged to engage the other side of a blank on said mold in such a way that the blank is contacted along a line extending radially thereof, said tool having a tip located on an extension of the axis of said mold; means for rotating said tool and said mold so that the tool rolls along and jiggers the other side of a blank on said mold; rocking means for pivoting said tool about an axis which is perpendicular to the axis of said mold and which passes through the tip of said tool, said rocking means comprising a pivot supportingly connected with said tool and first fluid operated cylinder means for rotating said pivot with said tool; and reciprocating means for varying the distance between said tool and said mold, said reciprocating means comprising second fluid operated cylinder means arranged to move said tool and said pivot in the axial direction of said mold.

6. A machine as set forth in claim 5, further comprising adjustable stop means for arresting the tool in a position of minimum distance from said mold.

7. A machine as set forth in claim 5, further comprising adjustable stop means for arresting said tool means in a position of maximum inclination with reference to the axis of said mold.

8. A machine as set forth in claim 5, wherein said rocking means further comprises elongated motion transmitting means connected with and extending from said pivot in a direction away from said tool, said first cylinder means being arranged to rock said motion transmitting means in a direction to rock the tool away from the blank and to release the arm so that the tool may rock by gravity into engagement with the blank.

9. A machine as set forth in claim 8, further comprising brake means for regulating the speed of said tool after said motion transmitting means is released by said first cylinder means.

References Cited

UNITED STATES PATENTS

| 1,466,216 | 8/1923 | Vengrin et al. | 51—206 |
| 1,658,601 | 2/1928 | Klaus et al. | 72—105 |
| 1,765,804 | 6/1930 | Preston | 264—312 |
| 2,223,472 | 12/1940 | Whitten | 72—107 |
| 2,384,845 | 9/1945 | Miller | 264—312 |
| 2,599,910 | 6/1952 | Guthrie | 25—26 |
| 3,077,060 | 2/1963 | Cooper | 51—105 |
| 3,261,192 | 7/1966 | Saito et al. | 72—106 |
| 2,830,320 | 4/1958 | Geppert | 264—210 |
| 2,876,522 | 3/1959 | Johnson | 25—24 |

FOREIGN PATENTS

| 562,140 | 1923 | France. |

ROBERT F. WHITE, *Primary Examiner.*

ALEXANDER H. BRODMERKEL, *Examiner.*

J. R. DUNCAN, S. I. LANDSMAN,
*Assistant Examiners.*